US008330302B2

(12) United States Patent
Wallmeier et al.

(10) Patent No.: US 8,330,302 B2
(45) Date of Patent: Dec. 11, 2012

(54) DEVICE FOR THE IGNITION AND THE START-UP OF SILICON RODS

(75) Inventors: Peter Wallmeier, Lippstadt (DE); Holger Diezmann, Iserlohn (DE)

(73) Assignee: AEG Power Solutions, B. V., Zwanenburg (NL)

( * ) Notice: Subject to any disclaimer, the term of this patent is extended or adjusted under 35 U.S.C. 154(b) by 318 days.

(21) Appl. No.: 12/720,123

(22) Filed: Mar. 9, 2010

(65) Prior Publication Data
US 2010/0231039 A1    Sep. 16, 2010

(30) Foreign Application Priority Data
Mar. 11, 2009   (DE) .................... 20 2009 003 325 U

(51) Int. Cl.
*G05F 3/06* (2006.01)
(52) U.S. Cl. ...................................................... 307/151
(58) Field of Classification Search ................... 307/151
See application file for complete search history.

(56) References Cited

U.S. PATENT DOCUMENTS
3,941,900 A    3/1976   Stut et al.

FOREIGN PATENT DOCUMENTS
CN           1753293 B        3/2006
DE   20 20004 014 812 U1   12/2004

OTHER PUBLICATIONS

European Search Report for Application EP 10 15 5612 mailed Aug. 16, 2010.
Chinese Office Action and English-language translation dated Aug. 29, 2012 for CN Application No. 201010134077A corresponding to related U.S. Appl. No. 12/720,123.

*Primary Examiner* — Robert L. DeBeradinis
(74) *Attorney, Agent, or Firm* — Norris McLaughlin & Marcus, P.A.; Christa Hildebrand

(57) ABSTRACT

The invention relates to a circuit arrangement for igniting four thin silicon rods in a reactor for producing from the thin silicon rods silicon rods according to the Siemens process and for starting up such reactor. Also described is a method for igniting the thin silicon rods and for starting up, i.e., commencing operation of the reactor.

18 Claims, 2 Drawing Sheets

DEVICE FOR THE IGNITION AND THE START-UP OF SILICON RODS

Figure 1:
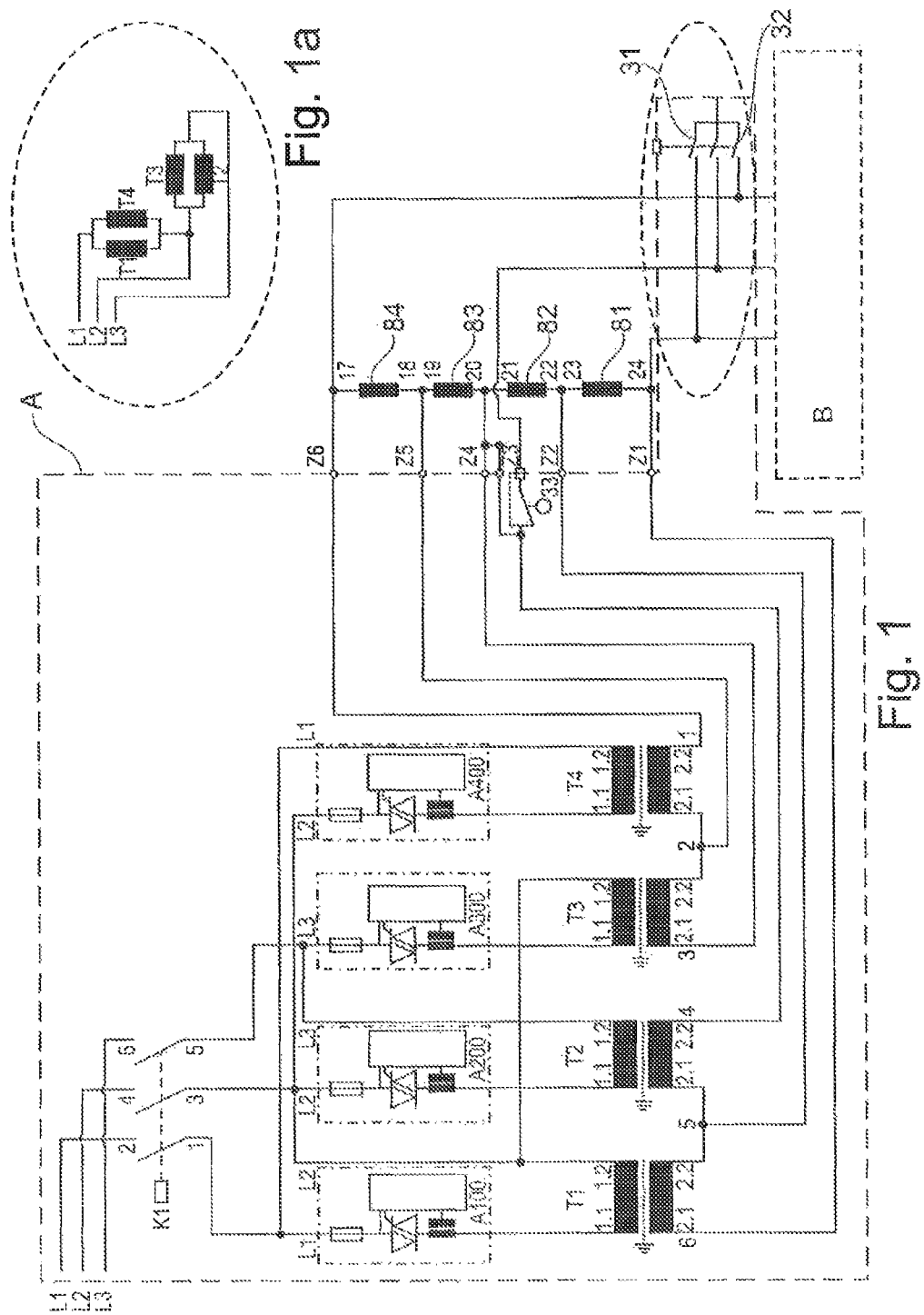

BACKGROUND OF THE INVENTION (1) Field of the Invention

The invention relates to a circuit arrangement for igniting four thin silicon rods in a reactor for producing from the thin silicon rods silicon rods according to the Siemens process and for starting up such reactor. Also described is a method for igniting the thin silicon rods and for starting up, i.e., commencing operation of the reactor.

(2) Description of Related Art

The document DE 20 2004 014 812 U1 describes a device for supplying a reactor for producing silicon rods according to the Siemens process, which has first supply means for supplying a voltage and second supply means for supplying a voltage. The first supply means is provided to supply a voltage to the thin silicon rods during a startup phase of the deposition process, i.e., during ignition of the thin silicon rods and startup of the reactor. The second voltage supply means is provided to ensure that a voltage is supplied to the thin silicon rods and the developing silicon rods subsequent to the startup phase during operation.

During the startup phase, the thin silicon rods are supplied by the first supply means with a so-called medium voltage which is greater than 2500 V. Such high voltages are capable of igniting the thin silicon rods. After all silicon rods have been ignited, the startup phase ends. The voltage supply of the thin silicon rods and of the silicon rods formed thereon is then assumed by the second supply means, which supplies the thin silicon rods with a voltage of less than 2500 V.

In the operating the phase, the thin silicon rods and the silicon rods, respectively, are connected in series and the series connection is supplied with a voltage from the second supply means. Alternatively, the thin silicon rods and/or the silicon rods can, during the operating phase, be initially individually supplied with the voltage provided by the second supply means, or supplied with the voltage in groups, or connected in series. The configuration between the various switching arrangements can be changed during the operating phase, depending on the electrical resistance of the silicon rods and the power to be dissipated in the silicon rods.

In the disclosed configuration, the device described in the aforementioned document has not met with acceptance in practical applications. Instead, devices have been constructed in practice where power switches are arranged in series with the input terminals of the second voltage supply means. However, the power switches are technically complex and expensive, in particular because they need to be suitable for medium voltages. In addition, they must be capable of carrying currents in excess of 1000 A during the operating phase. Because this is a mechanical component, the power switch requires maintenance during the service life of the reactor.

BRIEF SUMMARY OF THE INVENTION

It is therefore an object of the invention to propose a circuit arrangement for igniting four thin silicon rods in a reactor for producing from the thin silicon rods four silicon rods according to the Siemens process and for starting up such reactor, wherein the circuit arrangement eliminates, on one hand, a power switch for high currents in the current path and, on the other hand, ensures ignition of all thin silicon rods.

This object is solved by a device having the features according to claim 1.

The circuit arrangement according to the invention has a first terminal, a second terminal and a third terminal for connection to a three-phase mains supplying electric power. For connecting the thin silicon rods and the silicon rods, respectively, the circuit arrangement of the invention has a total of five terminals, of which two are designated outer terminals and three are designated inner terminals.

The circuit arrangement according to the invention has a total of four transformers, of which each transformer is arranged to supply a corresponding one of the thin silicon rods or silicon rods. Two of the four transformers are designated as outer transformers and two transformers as inner transformers. Each transformer has a primary winding and a secondary winding.

Moreover, a total of four power controllers for controlling current to the primary windings of the transformers are provided. The two power controllers associated with the two outer transformers are designated as outer power controllers, and the two power controllers associated with the two inner transformers are designated as inner power controllers.

The circuit arrangement has one or more control means at least for controlling the power controllers.

In a circuit arrangement according to the invention, the primary windings of the outer transformers are connected in parallel. This parallel connection is connected to the three-phase mains, on one hand, via the first terminal and, on the other hand, via the second terminal. The primary windings of the inner transformers are also connected in parallel. This parallel connection is connected, on one hand, to the second terminal and, on the other hand, to the third terminal for connection to the three-phase mains.

In addition to the aforementioned connection of the primary sides of the transformers, the connection of the secondary sides is also important for the circuit arrangement of the invention. To this end, the taps of the transformers are connected to one another and with the terminals for the thin silicon rods and/or the silicon rods in the following way.

The first tap of the secondary winding of a first of the two outer transformers is connected to a first of the two outer terminals, whereas a second tap of the secondary winding of the first outer transformer is connected to a first tap of the secondary winding of the first transformer of the two inner transformers. In addition, the second tap of the first outer transformer and the first tap of the first inner transformer are connected to a first terminal of the three inner terminals.

A second tap of the secondary winding of the first inner transformer is connected to a first tap of the secondary winding of a second transformer of the two inner transformers and with a second of the three inner terminals.

A second tap of the secondary winding of the second inner transformer is connected to a first tap of secondary winding of a second transformer of the two outer transformers and with a third of the three inner terminals.

Finally, a second tap of the secondary winding of the second outer transformer is connected to a second of the two outer terminals.

In a circuit arrangement according to the invention, the two outer terminals can be connected by switching means with one another and to ground. The switching means can be controlled by the one or more control means.

The circuit arrangement according to the invention is particularly suited for being coupled to a conventional second circuit arrangement, for example a second voltage supply means mentioned before for supplying the thin silicon rods and/or the silicon rods during an operating phase, i.e., after ignition of the thin silicon rods and after startup of the reactor.

Two outer terminals of the output of the second circuit arrangement have the same electrical potential as the outer terminals of the circuit arrangement of the invention. Advantageously, the outer terminals are connected via controllable switching means to ground during the startup phase, i.e., during ignition of the rods and during startup of the reactor. An additional terminal of the output of the second circuit arrangement is also connected to ground during the startup phase. This additional terminal of the output is disconnected from the second inner terminal by a switching means, but is connected to the second inner terminal during the operating phase via a second and third silicon rod.

Connecting both outer terminals of the circuit arrangement of the invention to ground during the startup phase obviates the need for switching means arranged in the load circuit of the second circuit arrangement for coupling the two circuit arrangements. This prevents feedback of the circuit arrangement of the invention to a second circuit arrangement which supplies electric energy to the rods during the operating phase. The controllable switching means are opened during the operating phase that follows the startup phase.

A circuit arrangement according to the invention may include current measuring means for measuring the current flowing through the primary windings of the transformers. It is also feasible for the circuit arrangement to include voltage measuring means for measuring the voltage across the primary windings of the transformers. It would also be feasible for a circuit arrangement of the invention to include current and voltage measuring means configured to measure the current and/or voltage through or across the secondary windings the transformers.

The current measuring means and the voltage measuring means of a circuit arrangement according to the invention can be connected to the one or more control means of the circuit arrangement.

The transformers of a circuit arrangement according to the invention are suitable and configured for transforming a low-voltage on the primary site, for example an AC voltage of 400 V, into a medium voltage on the secondary side, for example an AC voltage of 6 kV to 8 kV.

The transformers can have a turns ratio of 15 to 20. The transformers are preferably identical. In particular, the primary windings as well as the secondary windings have identical winding sense.

The one or more control means of a circuit arrangement of the invention can be suitable and configured so that for igniting the thin silicon rods connected to one of the outer terminals and one of the inner terminals, the power controllers are first switched on sequentially, with the outputs of the power controllers connected to the transformers and the secondary coils of the transformers connected to an outer terminal and an inner terminal. The secondary voltage of the associated transformers is thereby initially applied to those thin silicon rods arranged at the beginning and the end of the series connection of the thin silicon rods. The one or more control means are configured so that initially one of the two thin silicon rods is ignited and subsequently the other silicon rod is ignited. Accordingly, the voltage is not simultaneously, but sequentially, applied to the thin silicon rods.

According to the invention, the one or more control means are advantageously suitable and configured so that for igniting those thin silicon rods connected exclusively to two of the inner terminals, the outer power controllers are sequentially switched on. After the thin silicon rods, to which electric energy is supplied via the outer power controllers to the outer transformers, are ignited, voltage is sequentially applied to the thin silicon rods arranged between these two thin silicon rods. The one or more control means are configured such that voltage is never applied to two thin silicon rods simultaneously.

The one or more control means and the power controllers may be suitable and configured according to the invention for regulating the current through the primary windings. For example, the current during ignition may be controlled to 20 A. According to the invention, the one or more control means may be suitable and configured to switch the power controller off when the controlled current through the primary winding or the voltage across the primary winding decrease to a predetermined value, for example to one half. The magnitude of the decrease of the voltage across the primary winding can be, for example, 200 V. After the voltage has decreased to the predetermined value, it can be assumed that the thin silicon rod supplied via the power controller or transformer has ignited.

After all the silicon rods have ignited and voltage is applied by the associated power controllers, the ignition phase is concluded and the reactor is started up, i.e., commences operation.

The one or more control means can be suitable and configured to simultaneously switch on all power controllers, after the last power controller for starting up the reactor has been switched off, to adjust the current through the primary windings of all transformers to the same predetermined nominal value. Advantageously, the one or more control means can be suitable and configured to stepwise increase the nominal value. The nominal value can be increased until startup of the reactor is concluded and the startup phase has ended. After the startup phase has ended, energy can be supplied to the silicon rods during the operating phase via the second circuit arrangement.

According to the invention, the one of more control means can be suitable and configured to temporarily decrease the nominal value if the voltage across the primary site of one of the transformers deviates from the voltages across the primary windings of the other transformers by a predetermined amount. Such deviation can occur if ignition of one silicon rod is delayed. In this case, startup is stopped and the process returns to the previous step, to give the not yet ignited silicon rods sufficient time for ignition.

In a circuit arrangement according to the invention, the one or more control means can be configured such that all power controllers are switched off when the voltage across the primary winding of one of the transformers corresponds to the open-circuit voltage of this transformer. In this case, the transformer is not loaded, indicating that the thin silicon rod or the silicon rod does not close the current path via the secondary winding of the transformer. For example, the silicon rod may be broken. A fault of this type requires manual intervention from the operators.

According to the invention, a control means may be associated with each power controller. The circuit arrangement may also have one or more superordinate control means which are coupled to the control means associated with the power controllers. The superordinate control means may have an interface for connection to a superordinate control means of the second circuit arrangement. The superordinate control means can provide a signal via this interface to the superordinate control means of second circuit arrangement if the start of phase has been successfully concluded, meaning that all thin silicon rods have ignited and the reactor has successfully started up.

It should be mentioned that the terms thin silicon rod and silicon rod, respectively, as used in this application, may in practical embodiments include pairs of thin silicon rods or pairs of silicon rods.

BRIEF DESCRIPTION OF THE SEVERAL VIEWS OF THE DRAWING(S)

Additional features and advantages of the invention will become more apparent from the following description of the preferred exemplary embodiment illustrated in the appended drawings.

Figure 2:
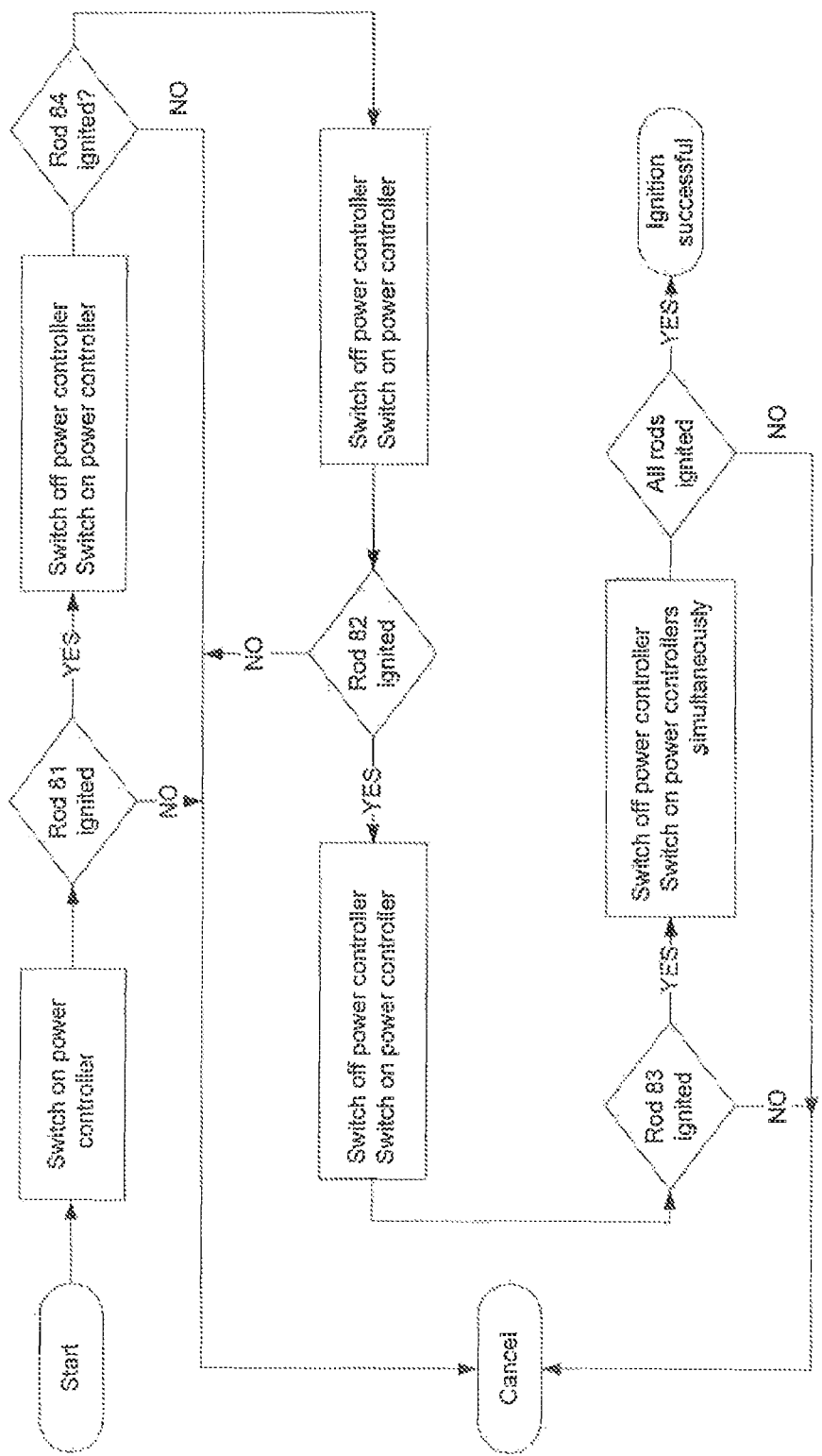

FIG. 1 shows a simplified circuit diagram of the circuit arrangement according to the invention, FIG. 1*a* shows a circuit diagram of the arrangement of primary windings without considering power controllers, and FIG. 2 shows a schematic flow diagram of a method carried out with the circuit arrangement.

DETAILED DESCRIPTION OF THE INVENTION

In the simplified circuit diagram of FIG. 1, the circuit arrangement according to the invention is indicated with A. The circuit arrangement A according to the invention has a switch K1 for connection to a three-phase power mains L1, L2, L3. Thin silicon rods 81 to 84 are connected to the terminals Z1, Z2, Z3/4, Z5, Z6 of the circuit arrangement A according to the invention. The thin silicon rods 81 to 84 are also connected to a second circuit arrangement B.

The circuit arrangement A of the invention and the second circuit arrangement B are connected to each other via an unillustrated bus for exchange of information, in particular status and control signals.

The circuit arrangement A of the invention is used to ignite the silicon rods and/or the thin silicon rods 81 to 84 and to start up the reactor in which the thin silicon rods 81 to 84 are arranged. Once the startup phase is concluded, the second circuit arrangement B assumes supply of voltage to the thin silicon rods 81 to 84, terminating voltage supply to the thin silicon rods 81 to 84 from the first arrangement A according to the invention.

For supplying power to the thin silicon rods during the startup phase, the circuit arrangement according to the invention includes power controllers A100, A200, A300, A400, transformers T1, T2, T3, T4, and the terminals Z1, Z2, Z3/4, Z5, Z6. The power controllers A100, A200, A300, A400 are each connected to one of the phases L1, L2, L3 and to a primary side of one of the transformers T1, T2, T3, T4. The primary sides of the transformers T1, T2, T3, T4 are also connected to one of the phases L1, L2, L3. An AC voltage of 400 V is present across the phases.

A power controller referred to as first outer power controller A100 is connected to the phase L1 and a first tap 1.1 of the primary winding of the transformer referred to as first outer transformer T1. A second primary-side tap 1.2 of the first outer transformer T1 is also connected to the second phase L2. More particularly, the following connections are provided:

A first inner power controller A200 is connected to the phase L2 and a first tap 1.1 on the primary site of the first inner transformer T2. A second tap 1.2 of the primary windings of the first inner transformer T2 is connected to the phase L3.

A second inner power controller A300 is connected to the phase L3 and a first primary-side tap 1.1 of a second inner transformer T3. A second tap 1.2 of the primary winding of the second inner transformer T3 is connected to the phase L2.

The fourth power controller, also referred to as the second outer power controller A400, is connected to the phase L2 and to a primary winding 1.1 of a transformer referred to as second outer transformer T4. A second primary-side tap 1.2 of the second outer transformer T4 is connected to the phase L1.

The transformers T1, T2, T3, T4 include secondary windings in addition to the primary windings. The secondary windings are connected to the terminals Z1, Z2, Z3/4, Z5, Z6, which are in turn connected to the thin silicon rods.

A first tap 2.1 of the secondary winding of the first outer transformer T1 is connected via a switching means 31 to ground. The first tap 2.1 of the secondary winding of the first outer transformer T1 is also connected to a first outer terminal Z1 of the terminals for the thin silicon rods. A second secondary-side tap 2.2 of the first outer transformer T1 is connected to a first inner terminal Z2. A first thin silicon rod 81 is connected to the first outer terminal Z1 and the first inner terminal Z2.

A first tap 2.1 of the secondary winding of the first inner transformer T2 is also connected to the first inner terminal Z2, whereas the second inner tap 2.2 is connected to a second inner terminal Z3. A second thin silicon rod 82 is connected to these two inner terminals Z2, Z3.

The inner terminal Z4 is connected to a first tap of the secondary winding of second inner transformer T3. A bridge is arranged between this inner terminal Z4 and the inner terminal Z3. Accordingly, considering the electrical potentials, these terminals form a single terminal which in the context of the present application is referred to as second inner terminal Z3/4. A second secondary-side tap 2.2 of the second inner transformer T3 is connected to a third inner terminal Z5. A third thin silicon rod 83 is connected to the second and third inner terminal Z3/4, Z5.

A first tap of the secondary winding of the second outer transformer T4 is connected to the third inner terminal Z5, and a second tap is connected to a second outer terminal Z6. A fourth thin silicon rod 84 is connected to the third inner terminal Z5 and of the second outer terminal Z6.

The second tap of the secondary winding of second outer transformer T4 is connected via a switching means 32 to ground.

During the startup phase, the switching means 31, 32 are closed. The switching means 31, 32 are implemented as controllable switching means which are controlled by a superordinate control means of the circuit arrangement A according to the invention.

The outer terminals Z1, Z6 and the second inner terminal Z3/4 are connected to the second circuit arrangement B configured to supply the thin silicon rods 80 with a voltage when the switching means 31, 32 are open and, optionally, an additional switching means 33 is closed.

Current measuring means and voltage measuring means for measuring currents through the primary coils or voltages across the primary coils are provided in the power controllers A100, A200, A300, A400.

The process for igniting the thin silicon rods 80 is as follows (FIG. 2):

First, the first outer power controller A100 is switched on. A voltage of 400 V is then present across the primary winding of the first outer transformer T1. With the turns ratio of 15, the secondary winding applies a secondary voltage of 6 kV across the first outer terminal Z1 and the first inner terminal Z2 and hence also across the first thin silicon rod 81. Due to the high voltage, the atomic integrity in the first thin silicon rod 81 breaks down. Valence electrons are separated from the outer atomic layer of the silicon atoms, enabling current flow through the thin silicon rod 81. The electrical conductivity of the thin silicon rod 81 thereby increases. The generated current flow causes a temperature increase in the material which depends on the current density. The temperature increase produces a further decrease in the electrical resistance. The thin silicon rod hence becomes more conducting with increasing temperature.

The primary voltage of the first outer transformer T1 then depends nonlinearly on the primary current flow. The first outer power controller monitors the primary voltage across the first outer transformer T1. If the voltage across the primary winding is less than 400 V, for example 200 V, at a current of 20 A, then the thin silicon rod 81 has ignited.

Conversely, if the primary voltage remains constant at 400 V, then the thin silicon rod 81 has not ignited. The silicon has then not become conducting, indicating a fault condition.

When the first thin silicon rod 81 has successfully ignited, the first outer power controller A100 is switched off, and the second outer power controller A400 is switched on. The second outer power controller A400 is also controlled such that a current of 20 A is established through the primary winding of the second outer transformer T4. The same processes as previously in the first thin silicon rod 81 then also occur in the fourth thin silicon rod 84. The fourth thin silicon rod 84 becomes increasingly conducting, and the voltage on the primary side of the second outer transformer T4 decreases. If the voltage reaches 200 V, it can be assumed that the fourth thin silicon rod 84 is successfully ignited.

The second thin silicon rod 82 and the third thin silicon rod 83 are then sequentially ignited in the same manner by switching on the first inner power controller A200 and the second inner power controller A300, respectively.

After all thin silicon rods 81 to 84 have successfully ignited, the reactor is started up (FIG. 2). All power controllers 10 are then switched on and adjusted so that a current of 20 flows through the primary winding in the transformers T1 to T4. The current on the primary side is then increased stepwise by 10 A. The primary-side voltages are continuously compared and it is safe to assume that no fault has occurred during startup, as long as the voltages are not significantly different from one another, for example by more than 5%.

If for igniting the thin silicon rods, the power controllers were not switched on sequentially, but all four power controllers were instead switched on simultaneously and voltage were also simultaneously applied to the connected thin silicon rods, then it would not be possible to reliably decide if all thin silicon rods had ignited. The connection between the secondary windings of the transformers interlinks the individual currents. It would then be impossible to predict which current flows through which load, when the power controllers were switched on simultaneously. The current through a transformer of a rod that had failed to ignite would then flow primarily through the already ignited rods. This situation is avoided by initially igniting all rods separately. The attained increase in temperature of the thin silicon rods is a positive side effect. Once all thin silicon rods have successfully ignited, they produce relatively high temperatures for the common process during startup of the reactor. Ignition may then occur at lower voltages, and ignition of the thin silicon rods during startup occurs more quickly.

After ignition of the first things silicon rod 81 the fourth thin silicon rod 84 is initially ignited, because the outer terminals 41, 45 are connected to ground. Individual ignition of the first thin silicon rod 81 and of the fourth thin silicon rod 84 prevents so-called skewing of the phases.

The invention claimed is:

1. A circuit arrangement (A) or igniting four thin silicon rods (81 to 84) in a reactor for producing a number of four silicon rods from the thin silicon rods (81 to 84) according to the Siemens process and for starting up the reactor, comprising
    a first terminal, a second terminal and a third terminal for connection to a three-phase mains,
    two outer terminals (Z1, Z6) and at least three inner terminals (Z2, Z3/Z4, Z5) for connecting the thin silicon rods (81 to 84),
    two outer transformers (T1, T4) and two inner transformers (T2, T3), each having a primary winding and a secondary winding,
    two outer power controllers (A100, A400) configured for controlling a current through the primary windings of the outer transformers,
    two inner power controllers (A200, A300) configured for controlling the current through the primary windings of the inner transformers,
    one or more control means for controlling the power controllers (A100, A200, A300, A400),
    wherein the primary windings of the outer transformers (T1, T4) are connected in parallel and the parallel connection being connected with the first terminal (L1) and with the second terminal (L2) for connection to the three-phase mains,
    wherein the primary windings of the inner transformers (T2, T3) are connected in parallel and this parallel connection is connected, on one hand, with the second terminal (L2) and, on the other hand, with the third terminal (L3) for connection to the three-phase mains,
    wherein a first tap (T1.2.1) of the secondary winding of the first (T1) of the two outer transformers (T1, T4) is connected to a first of the two outer terminals (Z1), and
    a second tap (T1.2.2) of the secondary winding of the first outer transformer (T1) is connected to a first tap (T2.2.1) of the secondary winding of the first transformer (T2) of the two inner transformers (T2, T3) and with a first terminal (Z2) of the three inner terminals (Z2, Z3/Z4, Z5),
    a second tap (T2.2.2) of the secondary winding of the first inner transformer (T2) is connected to a first tap (T3.2.1) of the secondary winding of the second transformer (T3) of the two inner transformers (T2, T3) and with a second terminal (Z3/4) of the three inner terminals (Z2, Z3/Z4, Z5),
    a second tap (T3.2.2) of the secondary winding of the second inner transformer (T3) is connected to a first tap (T4.2.1) of the secondary winding of a second transformer (T4) of the two outer transformers (T1, T4) and with a third terminal (Z4) of the three inner terminals (Z2, Z3/Z4, Z5),
    wherein a second tap (T4.2.2) of the secondary winding of the second outer transformer (T4) is connected to a second terminal (Z6) of the two outer terminals (Z1, Z6), and
    wherein the two outer terminals (Z1, Z6) are connected to one another and to ground by way of switching means (31, 32).

2. The circuit arrangement (A) according to claim 1, wherein the circuit arrangement (A) comprises current measuring means for measuring the current through the primary windings of the transformers (T1, T2, T3, T4).

3. The circuit arrangement (A) according to claim 2, wherein the current measuring means and the voltage measuring means are connected to the one or more control means.

4. The circuit arrangement (A) according to claim 1, wherein the circuit arrangement (A) comprises a voltage measuring means for measuring the voltage across the primary windings of the transformers (T1, T2, T3, T4).

5. The circuit arrangement (A) according to claim 1, wherein the transformers (T1, T2, T3, T4) are configured to transform a low voltage on the primary side into a medium voltage on the secondary site.

6. The circuit arrangement (A) according to claim 5, wherein the primary side is about 400 V and the medium voltage on the secondary is about 6 kV to 8 kV.

7. The circuit arrangement (A) according to claim 1, wherein the transformers (T1, T2, T3, T4) have a turns ratio of 15 to 20.

8. The circuit arrangement (A) according to claim 1, wherein the primary windings and/or the secondary windings of the transformers (T1, T2, T3, T4) have an identical number of turns and are wound with the same winding sense.

9. The circuit arrangement (A) according to claim 1, wherein the one or more control means are configured to ignite the thin silicon rods (81, 84), which are connectable with one of the outer terminals (Z1, Z6) and with one of the inner terminals (Z2, Z3/4, Z5), by first sequentially switching on the outer power controllers (A100, A200) and by closing the switching means (31, 32) for connecting the outer terminals (Z1, Z6) with one another and to ground.

10. The circuit arrangement (A) according to claim 9, wherein the one or more control means are configured to ignite the thin silicon rods (82, 83), which are connectable exclusively with the two inner terminals (Z2, Z3/4, Z5), by sequentially switching on the inner power controllers (A200, A300) and closing the switching means (31, 32) for connecting the outer terminals (Z1, Z6) with one another and to ground.

11. The circuit arrangement (A) according to claim 9, wherein the one or more control means and the power controllers (A100, A200, A300, A400) are configured to control the current through the primary windings.

12. The circuit arrangement (A) according to claim 11, wherein the one or more control means are configured to switch the power controllers (A100, A200, A300, A400) off, upon adjustment of the current through the primary winding, the voltage across the primary winding is reduced to a predetermined level.

13. The circuit arrangement (A) according to claim 12, wherein the one or more control means are configured, after the last power controller (A300) is switched off, to simultaneously switch on all power controllers (A100, A200, A300, A400) for starting up the reactor, so as to set an identical current with a predetermined nominal value on the primary windings of all transformers (T1, T2, T3, T4).

14. The circuit arrangement (A) according to claim 12, wherein the one or more control means are configured to increase the nominal value step-by-step.

15. The circuit arrangement (A) according to claim 12, wherein the one or more control means are configured to temporarily decrease the nominal value, if the voltage across the primary windings of one of the transformers (T1, T2, T3, T4) deviates by a predetermined amount from the voltages across the primary windings of the other transformers (T1, T2, T3, T4).

16. The circuit arrangement (A) according to claim 12, wherein the one or more control means are configured to switch off all power controllers (A100, A200, A300, A400), if the voltage across the primary winding of one of the transformers (T1, T2, T3, T4) corresponds the open-circuit of the transformer (T1, T2, T3, T4).

17. The circuit arrangement (A) according to claim 12, wherein the voltage across the primary winding is reduced by one half.

18. The circuit arrangement (A) according to claim 1, wherein a control means is associated with each power controller (A100, A200, A300, A400), and the circuit arrangement has a superordinate control means, which is coupled with the control means associated with the power controllers (A100, A200, A300, A400).

* * * * *